United States Patent [19]

Hanson

[11] Patent Number: 5,144,736

[45] Date of Patent: Sep. 8, 1992

[54] METHOD OF PROTECTING VEHICLE FINISHES

[76] Inventor: Edward Hanson, 50 Austin Ave., Apt. 412, Hayward, Calif. 94544

[21] Appl. No.: 793,194

[22] Filed: Nov. 18, 1991

Related U.S. Application Data

[63] Continuation of Ser. No. 571,310, Aug. 23, 1990, abandoned.

[51] Int. Cl.⁵ .................... B23P 17/04; B23P 25/00
[52] U.S. Cl. ........................... 29/403.1; 29/91.1; 29/419.1; 29/424; 29/458; 296/136
[58] Field of Search .............. 29/13, 21, 91.1, 401.1, 29/402.01, 402.02, 402.18, 402.19, 419.1, 423, 424, 458, 403.1; 264/51; 296/136

[56] References Cited

U.S. PATENT DOCUMENTS

| | | | |
|---|---|---|---|
| 1,976,329 | 10/1934 | Copeman | 296/136 X |
| 2,082,791 | 6/1937 | Copeman | 296/136 X |
| 3,130,078 | 4/1964 | Lewis et al. | 296/136 X |
| 3,241,877 | 3/1966 | Tate | 296/136 |
| 3,642,567 | 2/1972 | Rogers, Jr. | 296/136 X |
| 4,475,764 | 10/1984 | Hutchinson et al. | 296/136 |
| 4,837,914 | 6/1989 | Borum et al. | 29/401.1 |

FOREIGN PATENT DOCUMENTS

| | | | |
|---|---|---|---|
| 74040 | 10/1948 | Denmark | 296/136 |
| 790852 | 2/1958 | United Kingdom | 296/136 |

Primary Examiner—Joseph M. Gorski
Assistant Examiner—Peter Dungba Vo
Attorney, Agent, or Firm—Bielen, Peterson & Lampe

[57] ABSTRACT

A method of protecting the finish on a vehicle employs the immersing of a sheet of waste cellulose fiber material in an aqueous bath to render the sheet of cellulose fiber material pliable. A form in the shape of a portion of the vehicle to be protected is provided and the sheet of pliable material is placed over the form. The pliable cellulose material is dried to add rigidity to the same in the form of a shield. The finished shield is then placed on a vehicle to protect the finish characteristics such as exterior paint, trim, glass, and the like.

3 Claims, 1 Drawing Sheet

METHOD OF PROTECTING VEHICLE FINISHES

This is a continuation of application Ser. No. 07/571,310, filed Aug. 23, 1990 now abandoned.

BACKGROUND OF THE INVENTION

The present invention relates to a novel process for protecting the finish on a vehicle, especially during the assembly process for the vehicle.

Manufacturing methods for mass production of a modern vehicle generally employ consecutive steps. The outer shell of an automobile, for example, is constructed in a stamping plant without attachment to a chassis. Such shell or body is then painted and dried by an accelerated process. At this point, the body is mated with a chassis on the assembly line and the wheels, glass, motor, and drive train are added to produce a finished vehicle.

Unfortunately, during the assembly process a newly painted body is often damaged by assembly workers who are accomplishing necessary additions to the interior and exterior of the vehicle. It has been noted that this problem is especially acute on fenders and side doors.

In the past, cloth and plastic sheets have draped over the vehicle body with limited success. Sheets slip from the vehicle body and require repositioning to permit the workers to assemble the vehicle. Cloth and plastic sheets have been discovered to be poor protectors of the vehicle bodies, especially on vertical surfaces.

A process of inexpensively and efficiently protecting assembly line vehicles from cosmetic damage would be a notable advance in the vehicle assembly field.

SUMMARY OF THE INVENTION

The present invention relates to a novel and useful method of protecting vehicles from cosmetic damage in the assembly process.

The present invention employs the steps of obtaining and immersing a sheet of cellulose fiber material, such as paperboard, in an aqueous bath for a sufficient time to render the sheet of cellulosic fiber material pliable. The source of such cellulose fiber material is abundant in a vehicle assembly plant, since many components of a vehicle being assembled are shipped in paper board containers which are normally considered to be a waste material. After removal from the aqueous bath, the sheet of pliable cellulose fiber material is placed over a form which is in the shape of a vehicle or a portion of the vehicle. For example, the form may take the shape of the hood and fender area of an automobile being assembled. After merging of the sheet of pliable cellulose fiber material onto the form, the same is permitted to dry, which adds substantial rigidity to the fiber material. Essentially, the pliable cellulose fiber material is molded to the shape of the form. Thus, the pliable cellulose fiber material is transformed into a shield which may be placed over an actual vehicle being assembled and having at least a partial finish thereupon. The shield may be fastened to the vehicle by the use of a rope or line. Grommets or other reinforced type openings may be formed in the shield in an area which is not susceptible to damaging the finish on a vehicle.

It may be apparent that a novel and useful method of protecting the finish on a vehicle has been described.

It is therefor an object of the present invention to provide a method of protecting the finish on a vehicle which utilizes waste material normally found in a vehicle assembly facility.

It is another object of the present invention to provide a method of protecting the finish of a vehicle during the assembly process which utilizes a shield which does not damage the vehicle finish and yet is amply durable to permit reuse of the same on multiple vehicles.

It is yet another object of the present invention to provide a method of protecting the finish of the vehicle during the assembly process which is not susceptible to slipping from the surface of the vehicle being assembled.

A further object of the present invention is to provide a method of protecting the finish of a vehicle during the assembly process which includes the manufacture of a shield which is simple and quick to accomplish.

Another object of the present invention is to provide a method of protecting the finish of a vehicle during assembly process which permits the vehicle to be assembled and prevents expensive reworking of the finished product process i.e. the vehicle which has been damaged during the assembly thereof.

The invention possesses other objects and advantages especially as concerns particular characteristics and features thereof which will become apparent as the specification continues.

Figure 1:
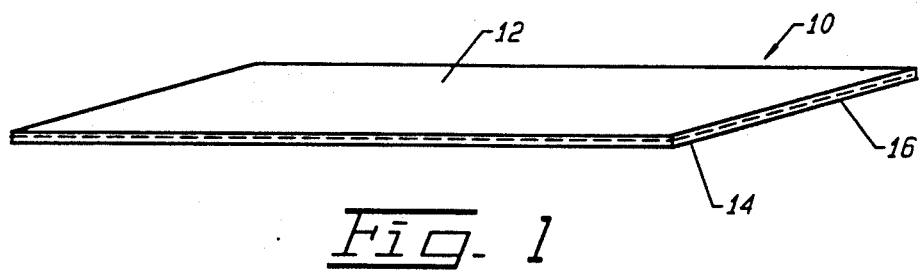
FIG. 1 is a top, right, perspective view of a sheet of cellulose fiber material.
Figure 2:
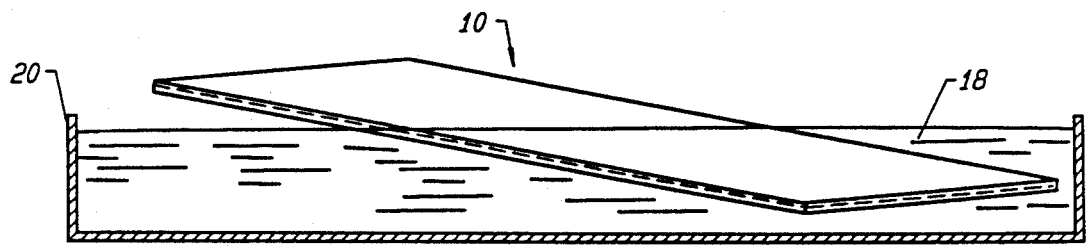
FIG. 2 is a perspective view of the cellulose fiber material being placed in an aqueous bath which is depicted in section.

For a better understanding of the invention reference is made to the following detailed description of the preferred embodiments thereof which should be referenced to the hereinabove described drawings.

DESCRIPTION OF THE PREFERRED EMBODIMENTS

Various aspects of the present invention will evolve from the detailed description of the preferred embodiments thereof which should be referenced to the prior described drawings. The invention as a whole includes a process which utilizes a sheet of cellulose fiber material 10 having an upper surface 12, and under surface 14 and an edge portion 16 which extends around the perimeter of sheet 10. For example, sheet 10 may be constructed of paperboard or cardboard which is commonly found as a waste material in vehicle assembly facilities. Currently, such cellulose fiber material is being discarded.

Sheet 10 of cellulose fiber material is immersed in an aqueous bath 18 found in container 20. Such immersion takes place for a sufficient time to render sheet 10 pliable. It has been found that sheet 10 retains a high degree of strength even in such pliable state and may be easily removed from container 20.

Figure 3:
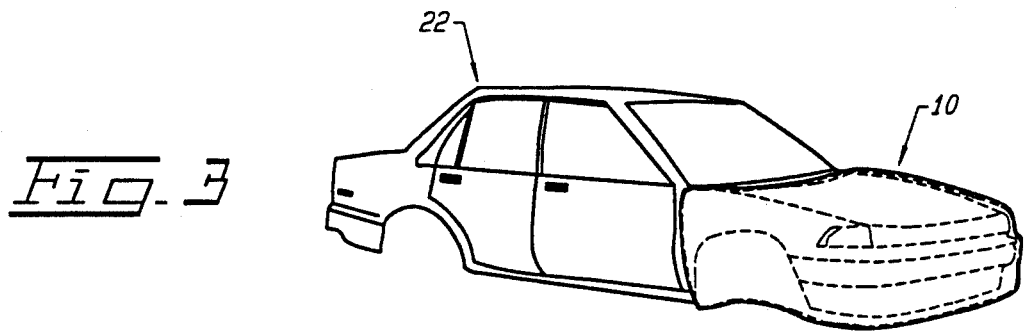
FIG. 3 is a perspective view of the pliable cellulose fiber material being molded over a form in the shape of the vehicle to be protected.

With reference to FIG. 3 it may be observed that a form 22 in the shape of a vehicle has been provided. Pliable sheet 10 has been placed over form 22 at the hood and fender area. However, it may be understood that sheet 10 may placed over any other area of form 22. For example, sheet 10 might have been placed over the roof of form 22. Sheet 10 is urged around form 22 and left to dry.

Figure 4:
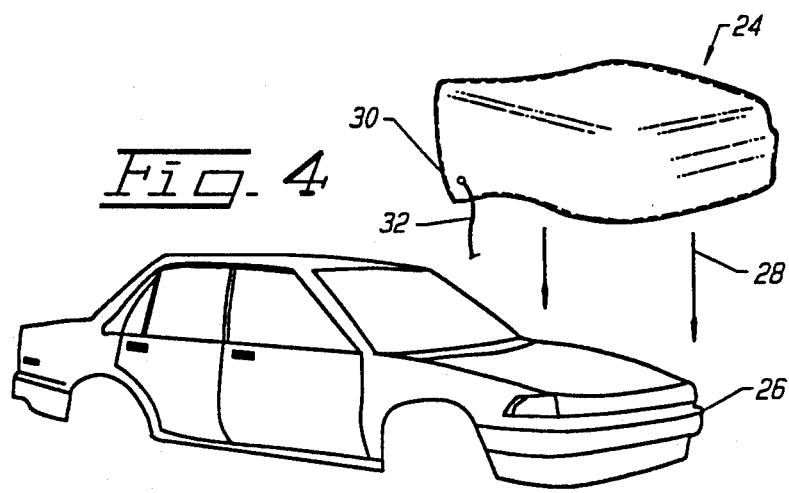
FIG. 4 is an exploded perspective view showing the shield form created from the cellulose fiber material and the placement of the same relative to a finished vehicle.

With reference to FIG. 4 it may be seen that sheet 10 has been molded through the drying process into a shield possessing a fair degree of rigidity and may be placed on actual vehicle 26, according to directional arrows 28. A hole or grommet 30 may be constructed in shield 24 to permit a tie line 32 to be attached thereto. Opening 30 is placed in a portion of shield 24 which is least likely to contact or cause any damage to the finish of actual vehicle 26. It should be noted that vehicle 26 has been painted prior to assembly.

After shield 24 has been placed over the hood and fender area of vehicle 26, further assembly of the vehicle may proceed. Shield 24 serves to protect the finish of vehicle 26 by assembly workers, machines, and other potentially damaging elements. After assembly of vehicle 26, shield 24 may be removed and reused on a similar vehicle to vehicle 26. Surface 14 of shield 24 possesses a softness which is non-damaging to the finish of vehicle 26. Also, sheet 10 possesses a thickness which affords a degree of shock absorbing capability of objects impinging on surface 12 thereof.

While in the foregoing embodiments of the present invention have been set forth in considerable detail, it may be apparent to those of skill in the art that numerous changes may be made in such details without departing from the spirit and principles of the invention.

What is claimed is:

1. A method of protecting the finish of a vehicle during the assembly of the vehicle utilizing waste material comprising the steps of:
   a. immersing a sheet of waste cellulose fiber material in an aqueous bath sufficiently thereby softening said sheet of cellulose fiber material pliable;
   b. providing a form having a shape of at least a portion of the vehicle;
   c. urging said sheet of a pliable cellulose fiber material onto said form;
   d. drying said pliable cellulose fiber material on said form thereby producing a shield of said cellulose fiber material in the shape of said form and with a degree of rigidity; and
   e. placing the relatively rigid cellulose fiber material shield on the vehicle to be protected.

2. The process of claim 1 in which said method step of immersing a sheet of cellulose fiber material includes utilizing paperboard as said waste cellulose fiber material.

3. The process of claim 2 which additionally comprises the step of fastening said relating rigid cellulose fiber material shield to the vehicle after said step of placing said relatively rigid cellulose fiber material shield on the vehicle.

* * * * *